United States Patent
Fenchl et al.

(10) Patent No.: US 6,608,159 B2
(45) Date of Patent: Aug. 19, 2003

(54) POLYMERIC, ACRYLAMIDE-FREE WATER RETENTION AGENT

(75) Inventors: Andrea Fenchl, Wasserburg (DE); Johann Plank, Trostberg (DE)

(73) Assignee: SKW Polymers GmbH, Trostberg (DE)

( * ) Notice: Subject to any disclaimer, the term of this patent is extended or adjusted under 35 U.S.C. 154(b) by 0 days.

(21) Appl. No.: 10/244,817

(22) Filed: Sep. 16, 2002

(65) Prior Publication Data

US 2003/0069375 A1 Apr. 10, 2003

(30) Foreign Application Priority Data

Sep. 18, 2001 (DE) ......................................... 101 45 943
Jul. 3, 2002 (DE) ......................................... 102 29 837

(51) Int. Cl.$^7$ ................................................. C08F 12/30
(52) U.S. Cl. ........................ 526/288; 526/240; 526/271; 526/318.2; 526/333
(58) Field of Search ................................ 526/240, 271, 526/288, 318.2, 333

(56) References Cited

U.S. PATENT DOCUMENTS 3,525,688 A * 8/1970 Swanson ..................... 252/8.5
3,898,037 A * 8/1975 Lange et al. ................. 21/2.7 R
4,309,523 A * 1/1982 Engelhardt et al. ......... 526/240

FOREIGN PATENT DOCUMENTS

EP 0 572 697 A1 * 12/1993
WO WO 00/09625 * 2/2000

* cited by examiner

Primary Examiner—Helen L. Pezzuto
(74) Attorney, Agent, or Firm—Fulbright & Jaworski L.L.P.

(57) ABSTRACT

This polymeric, acrylamide-free water retention agent, intended inter alia for drilling fluids in the high-temperature range and based on vinylic sulfonic acids, may be composed of the two principal components A and B, component A being selected from the group a) consisting of vinylic substituted sulfonic acid of the series 2-acrylamido-2-methylpropanesulfonic acid (AMPS), vinylsulfonic acid, methallylsulfonic acid or styrenesulfonic acid, salts thereof with a valence of at least 1, or mixtures thereof, or b) a divalent salt of homopolymers or copolymers of a vinylic substituted sulfonic acid of the series 2-acrylamido-2-methylpropanesulfonic acid (AMPS), vinylsulfonic acid, methallylsulfonic acid or styrenesultonic acid or mixtures thereof. In the case where component A comprises group a), the polymer further comprises component B) composed of a) from 4.99 to 60 mol % of an unsaturated, polybasic, cis-positioned carboxylic acid monomer and b) from 0.01 to 10 mol % of a monomer having a polyalkylene oxide side chain which contains from 1 to 120 repeating units of the alkylene oxide. The claimed composition, in particular in the form of a copolymer having a molar weight of between 10 000 and 3 000 000 g/mol, is used preferably in drilling fluids and as an additive to cement slurries with electrolyte contents of between 50 ppm and saturation at temperatures above 200° F. and/or in the presence of formates.

15 Claims, No Drawings

POLYMERIC, ACRYLAMIDE-FREE WATER RETENTION AGENT

DESCRIPTION

The present specification relates to polymeric water retention agents which contain no free acrylamide and are based on vinylic sulfonic acids and to their use.

Drilling fluids are used very generally in the processes referred to as rotary processes for drilling for oil and gas These processes are based on the rotation of the drillstring which has at its end the drill bit. The bit drills through the rock and as it does so forms what are known as drillings, which accumulate as drilling progresses. Pumped through the hollow drillstring is a drilling fluid which emerges at the drill bit and flows through the annular space between drill drain and rock formation back to the surface, while fulfilling the following principal functions:

a) lubricating and cooling the drill bit b) suspending and discharging the drillings c) stabilizing the borehole against the formation pressure Formations containing oil and gas are generally composed of porous rock strata, so that the production rate of the oil or gas is heavily dependent on the permeability of the respective formations. When drilling through such porous structures it is therefore desirable to use a drilling fluid which prevents the penetration of sizeable amounts of liquid or solids into these strata, prevents blockage of the pores, and generally prevents any deterioration in the permeability for oil or gas, this being referred to as filtrate control.

Filtrate control is also of great importance, however, in the cementation of a borehole, where a casing is introduced into the borehole and a cement slurry is pumped into the cavity between the formation and the casing. In this case the cement slurry is subjected to high hydrostatic pressures, with the consequence that water may be pressed from the cement slurry into the formation. This results not only in the described damage to the formation but also in a loss of the water which is needed for complete setting of the cement.

The prior art has disclosed a variety of additions to drilling fluids or cement slurries:

For instance, U.S. Pat. No. 4,309,523 discloses a high-temperature-stable drilling fluid additive which is composed preferably of 2-acrylamido-2-methyl-propanesulfonic acid (AMPS), N-vinylalkylamide and acrylamide terpolymers.

In accordance with U.S. Pat. No. 3,898,037, AMPS copolymers are used as dispersants for insoluble particles in aqueous systems, with the comonomers listed including itaconic acid and maleic acid.

In order to control fluid loss, the EP patent 572 697, for water-based drilling muds, provides polymeric additives which are composed of from 10 to 90% by weight of AMPS, from 1 to 60% by weight of alkylacrylamide, from 1 to 60% by weight of various nonionic, α-ethylenically unsaturated monomers and from 1 to 60% by weight of carboxyl-containing monomers, such as maleic acid, for example.

U.S. Pat. No. 4,741,843 describes terpolymers of AMPS, nonionic, α-ethylenically unsaturated monomers (e.g., acrylamide) and unsaturated polybasic acids, which are used as fluid loss additives in particular for calcium-containing drilling fluids.

WO 00/09625 teaches the use of an additive which stabilizes clay slate and comprises maleic acid polyethylene glycol semiester-styrene copolymer. U.S. Pat. No. 3,525,688, finally, discloses a drilling fluid to which polyethylene glycol is added in order to control the rheological properties.

These two last-mentioned documents do not indicate any connection with filtrate-reducing properties of the additives employed.

Disadvantages of all of these known additives, among other things with filtrate-reducing properties, are their carcinogenicity when they contain fractions of free acrylamides or else their sometimes deficient stability under the usually extreme conditions, especially those of drilling.

As a result of these serious disadvantages of the prior art, the object which has emerged for the present invention is to provide water retention agents based on vinylic sulfonic acids, which contain no free acrylamide and are suitable for drilling fluids and cement slurries, which greatly reduce the filtrate loss from drilling fluids even at temperatures above 200° F., at very high pressures and electrolyte concentrations, and which, furthermore, contain no carcinogenic monomers.

The term "free acrylamide" here refers to all fractions of the compound having the CAS No. [79-06-1]. Acrylamide comprising compounds such as 2-acrylamido-2-methylpropanesulfonic acid (AMPS), for example, or other acrylamide derivatives are explicitly not covered by this definition.

Said object has been achieved with a corresponding water retention agent composed of 1) $\geq 30$ mol % of component A which is selected from the group consisting of a) vinylic substituted sulfonic acid of the series 2-acrylamido-2-methylpropanesulfonic acid (AMPS), vinylsulfonic acid, methallylsulfonic acid or styrenesulfonic acid, salts thereof with a valence of at least 1, or mixtures thereof, or b) a divalent salt of homopolymers or copolymers of a vinylic substituted sulfonic acid of the series 2-acrylamido-2-methylpropanesulfonic acid (AMPS), vinylsulfonic acid, methallylsulfonic acid or styrenesulfonic acid or mixtures thereof, and in case 1a)

2) component B), composed of a) from 4.99 to 60 mol % of an unsaturated, polybasic, cis-positioned carboxylic acid monomer and b) from 0.01 to 10 mol % of a monomer having a polyalkylene oxide side chain which contains from 1 to 120 repeating units of the alkylene oxide.

With the polymers of the present invention it has surprisingly been found that they develop their highly pronounced water retention effect as fluid loss additives, in particular in drilling applications, even under very extreme conditions, with consistent quality. In this context it is worth mentioning in particular that the polymers of the invention are able to develop their thickening effect even in drilling fluids which comprise alkali metal formate weighting agents. This is all the more surprising on account of the fact that such drilling fluids were hitherto regarded as being virtually impossible to thicken.

It has also been found, again surprisingly, that when salt forms of component A are employed the counterion apparently has a very positive influence on the water retention effect.

For this reason not least the present invention provides on the one hand that when the monomer 1a) is present in salt form said salt comprises as its cation one from the series $Na^+$, $K^+$, $Ca^{2+}$, $Mg^{2+}$, $Zn^{2+}$, $Ba^{2+}$ and/or $Fe^{2+}$. On the other hand, the sulfonic acids in the form of their homopolymers and/or copolymers may comprise divalent salt counterions, preferably $Ca^{2+}$, $Mg^{2+}$, $Zn^{2+}$, $Ba^{2+}$, and $Fe^{2+}$.

In comparison with, for example, sodium, potassium and also ammonium, in other words monovalent counterions, it was possible to lower the fluid loss levels by approximately 50% in respect of component 1b), for example, with magnesium and calcium counterions.

The anions here do not have such a critical role, and so it is possible easily to employ the otherwise customary carbonates, sulfates, hydroxides or else chlorides. There is likewise no need to stress the possibility that the vinylic sulfonic acids co-claimed as component A can be substituted by organic radicals, such as $C_{1-4}$ alkyl or suitable aromatics, for example.

In addition to the claimed variant wherein the homopolymer and/or copolymer 1b) of the invention further comprises up to 70 mol % of a monovalent salt and in particular of a sodium, potassium and/or ammonium salt of vinylsulfonic acid, styrenesulfonic acid, methallylsulfonic acid and/or AMPS, the present invention also provides the possibility that the homopolymer and/or copolymer 1b) comprises up to 50 mol % of at least one unsaturated, polybasic, cis-positioned carboxylic acid compound, such as maleic acid, maleic anhydride (MSA), citraconic acid or itaconic acid, for example, as comonomer. With these variants a further surprising effect, namely a synergistic effect, has been found: Na-AMPS-MSA copolymers, for example, exhibit a fluid loss effect which is comparable with that of the Na-AMPS homopolymer. With the polymers 1b), including the inventive polymers 1b), in the form of Ca-AMPS-MSA copolymers, for example, the fluid loss level is drastically reduced to only ⅓.

With respect to the monomer 2a), maleic acid, maleic anhydride, citraconic acid, itaconic acid and mixtures thereof are regarded as preferred polybasic, cis-positioned acids.

As with component A, in the case of monomer 2a) as well particularly suitable monomers are those which are present at least in part in the form of a salt of an at least monovalent cation of the series $Na^+$, $K^+$, $Ca^{2+}$, $Mg^{2+}$, $Zn^{2+}$, $Ba^{2+}$ and/or $Fe^{2+}$.

The polyalkylene oxide side chain of the monomer 2b), which is required to contain between 1 and 120 repeating units of the alkylene oxide, particularly in the form of a polyethylene oxide, polypropylene oxide, polytetrahydrofuran or mixtures thereof, may preferably be in the form of (meth)acrylate, (meth)acrylamide, vinyl ester, monoester or amide of maleic acid in the polymer backbone. In this respect the invention also provides that the polyalkylene oxide side chain is preferably either hydroxy-terminated or methoxy-terminated.

Overall, among the polymeric agents claimed, those which have been found particularly advantageous are those whose molar weight lies between 10 000 and 3 000 000 g/mol, with variants having a molar weight of between 75 000 and 1 000 000 g/mol being regarded as especially preferred.

The polymeric water retention agents of the present invention composed of components Ab) or Aa) and B may in principle be prepared by means of all conventional polymerization processes; however, preference is given to those agents which can be prepared by solution, precipitation, gel, emulsion or suspension polymerization.

In addition to the polymeric, acrylamide-free water retention agent itself, the present invention also claims its use in drilling for oil, gas and water, particular preference being given to its use as an additive to drilling fluids, completion fluids, workover fluids and/or in cement slurries.

A particular advantage when using the polymers of the invention can be achieved when they are used in drilling media with high electrolyte contents of between 50 ppm and their saturation point and/or at temperatures of more than 200° F. and with particular preference more than 400° F.

A further advantage of the agent of the invention is considered its use for drilling fluids, completion fluids and/or workover fluids which comprise formates and especially alkali metal formates, and this is likewise taken into account by the present invention.

Finally, the present invention also claims the use of the agents as water retention agents in the construction sector, especially for plasters, tile adhesives, and leveling compounds.

In summary, the advantages of the water retention agent of the invention are regarded as being that it develops a very pronounced water retention effect as a fluid loss additive for drilling fluids, completion and workover fluids and also cement slurries and generally in the construction sector, even under very extreme conditions, with consistent quality and that it maintains in particular the significantly improved filtrate-reducing properties even under otherwise unfavorable drilling conditions such as high temperatures and/or high pressures and/or heightened electrolyte levels and in the presence of formates over the entire drilling system. In addition, the claimed agent is free from monomers which have proven carcinogenic, such as free acrylamides, for example.

These advantages of the present invention are illustrated by the following examples.

EXAMPLES

1. Synthesis Examples (Comparative)

1.1 Na-AMPS Homopolymer

A 1 L reaction flask with intensive condenser, KPG stirrer, thermometer and gas inlet tube was charged with 212 g of tap water containing 7.5 g of caustic soda. 37.5 g of AMPS monomer were dissolved in this initial charge and then flushed with inert nitrogen gas for 30 minutes. After the pH had been adjusted to neutral and the mixture heated to 60° C., the reaction was initiated with 1 g of 2,2'-azobis(N,N'-dimethylenebis-butyramidine) dihydrochloride. After 2 hours the reaction mixture was cooled to room temperature. The resulting solution had a solids content of 15% by weight and a viscosity of 1 400 cP (Brookfield Spindle No. 1; 20 rpm) at 20° C.

1.2 Na-AMPS-MSA Copolymer

A 1 L reaction flask with intensive condenser, KPG stirrer, thermometer and gas inlet tube was charged with 134 g of tap water containing 6 g of caustic soda. 30 g of AMPS monomer and 3.55 g of maleic anhydride were dissolved in this initial charge and then flushed with inert nitrogen gas for 30 minutes. After the pH had been adjusted to neutral and the mixture heated to 60° C., the reaction was initiated with 1 g of 2,2'-azobis(N,N'-dimethylenebis-butyramidine) dihydrochloride. After 2 hours the reaction mixture was cooled to room temperature. The resulting solution had a solids content of 20% by weight and a viscosity of 7 200 cP (Brookfield Spindle No. 1; 20 rpm) at 20° C., 2. Synthesis Examples (Invention)

2.1 Ca-AMPS Homopolymer

A 1 L reaction flask with intensive condenser, KPG stirrer, thermometer and gas inlet tube was charged with 212 g of tap water containing 8.9 g of calcium hydroxide. 50 g of AMPS monomer were dissolved in this initial charge and then flushed with inert nitrogen gas for 30 minutes. After the pH had been adjusted to neutral and the mixture heated to 60° C., the reaction was initiated with 1.3 g of 2,2'-azobis(N,N'-dimethylenebisbutyramidine) dihydrochloride. After 2 hours the reaction mixture was cooled to room temperature. The resulting solution had a solids content of 20% by weight and a viscosity of 11 000 CP (Brookfield Spindle No, 3; 20 rpm) at 20° C.

2.2 Ca-AMPS-MSA Copolymer

A 1 L reaction flask with intensive condenser, KPG stirrer, thermometer and gas inlet tube was charged with 134 g of tap water containing 6.7 g of calcium hydroxide. 30 g of AMPS monomer and 3.55 g of maleic anhydride were dissolved in this initial charge and then flushed with inert nitrogen gas for 30 minutes. After the pH had been adjusted to neutral and the mixture heated to 60° C., the reaction was initiated with 1 g of 2,2'-azobis(N,N'-dimethylenebis-butyramidine) dihydrochloride. After 2 hours the reaction mixture was cooled to room temperature. The resulting solution had a solids content of 20% by weight and a viscosity of 5 600 cP (Brookfield Spindle No. 2; 20 rpm) at 20° C.

2.3 Mg-AMPS-MSA Copolymer

A 1 L reaction flask with intensive condenser, KPG stirrer, thermometer and gas inlet tube was charged with 134 g of tap water containing 5.25 g of magnesium hydroxide. 30 g of AMPS monomer and 3.55 g of maleic anhydride were dissolved in this initial charge and then flushed with inert nitrogen gas for 30 minutes. After the pH had been adjusted to neutral and the mixture heated to 60° C., the reaction was initiated with 0.85 g of sodium persulfate. After 2 hours the reaction mixture was cooled to room temperature. The resulting solution had a solids content of 20% by weight and a viscosity of 7 200 cP (Brookfield Spindle No. 2; 20 rpm) at 20° C.

2.4 AMPS-MSA-MPEG (meth) Acrylate Copolymer

A 500 mL reaction flask with intensive condenser, KPG stirrer, thermometer and gas inlet tube was charged in each case with 180 g of tap water containing 15.0 g of sodium hydroxide. 45 g of AMPS monomer, 3 g of calcium hydroxide, 5.4 g of maleic anhydride and also MPEG methacrylate in various amounts (X g; batches a) to e)) were dissolved in this Initial charge and then flushed with inert nitrogen gas for 30 minutes and the mixture was subsequently heated to 60° C. The reaction was initiated with 1.5 g of 2,2'-azobis(N,N'-dimethylenebisbutyramidine)dihydrochloride. After 2 hours the reaction mixture was cooled to room temperature.

Variation in MPEG Methacrylate Side Chain Length, in Each Case with 1 mol % Fraction

| Example No. | Side chain length and initial weighing (X g) | | Solids content [% by weight] | Viscosity of the reaction solution [cP] |
|---|---|---|---|---|
| a) | — | (0 g) | 20.2 | 7 200 |
| b) | MPEG350 | (0.8 g) | 20.5 | 960 |
| c) | MPEG750 | (1.5 g) | 23.1 | 7 800 |
| d) | MPEG1000 | (2.0 g) | 22.1 | 9 100 |
| e) | MPEG2000 | (4.0 g) | 24.1 | 12 000 |

2.5 AMPS-MSA-PEG Vinyl Ether Copolymer

A 500 mL reaction flask with intensive condenser, KPG stirrer, thermometer and gas inlet tube was charged with 134 g of tap water containing 6.0 g of sodium hydroxide. 30 g of AMPS monomer, 3 g of calcium hydroxide, 2.0 g of PEG1000 vinyl ether and 3.55 g of maleic anhydride were dissolved in this initial charge and then flushed with inert nitrogen gas for 30 minutes and the mixture was subsequently heated to 60° C. The reaction was initiated with 1 g of sodium peroxodisulfate. After 2 hours the reaction mixture was cooled to room temperature. The solution obtained had a solids content of 21.7% by weight and a viscosity of 5 400 cP (Brookfield Spindle No. 3; 20 rpm) at 20° C.

2.6 AMPS-MSA-PEG-MSA Monoester Copolymer

A 500 mL reaction flask with intensive condenser, KPG stirrer, thermometer and gas inlet tube was charged with 120 g of tap water containing 9.0 g of sodium hydroxide. 30 g of AMPS monomer, 3 g of calcium hydroxide, 2.0 g of PEG1000 vinyl ether and 3.55 g of maleic anhydride were dissolved in this initial charge and then flushed with inert nitrogen gas for 30 minutes and the mixture was subsequently heated to 60° C. The reaction was initiated with 1 g of sodium peroxodisulfate. After 2 hours the reaction mixture was cooled to room temperature. The solution obtained had a solids content of 22.1% by weight and a viscosity of 10 400 cP (Brookfield Spindle No. 4; 20 rpm) at 20° C.

3. Application Examples for Drilling Fluids

The homopolymers and copolymers prepared in the synthesis examples were prepared by mixing in an amount of 4 ppb (pounds per barrel) in each case in a seawater fluid using a Hamilton Beach mixer (set at "low"), then subjected to dynamic aging for a period of 16 hours in a roller oven at 300° F., and tested in accordance with API standard 13 b, $2^{nd}$ edition for HTHP fluid loss determination at 350° F.

Fluid composition;
350 g tap water
12.7 g bentonite
9.5 g deflocculant
6.3 g polymer of the invention
14.3 g sea salt
618 g heavy spar
47.5 g artificial drilling dust (RevDust)
2 g caustic soda (pH=10–11)

The rheologies of the fluids were determined using a Fann Rheometer Model 35SA from Baroid Testing Equipment at 120° F.

3.1

| Polymer from | Rheology | PV | YP | HTHP FL |
|---|---|---|---|---|
| Example 1.1 | 106-74-62-48-26-25 | 32 | 42 | 90 |
| Example 1.2 | 125-88-74-59-35-32 | 37 | 51 | 90 |
| Example 2.1 | 186-115-87-56-18-17 | 71 | 44 | 44 |
| Example 2.2 | 101-57-41-24-3-3 | 44 | 13 | 24 |
| Example 2.3 | 79-66-49-26-25 | 38 | 41 | 24 |
| Hostadrill ® | 114-71-55-36-10-9 | 43 | 27 | 55 |

Hostadrill ® is a registered trade mark of Hoechst AG 3.2 Variation in Side Chain Length, in Each Case with 1 mol % Fraction

| Polymer from | Rheology | PV | YP | HTHP FL |
|---|---|---|---|---|
| Example 1.1 | 106-74-62-48-26-25 | 32 | 42 | 90 |
| Example 2.4b) | 57-30-22-14-5-5 | 27 | 3 | 94 |

-continued

| Polymer from | Rheology | PV | YP | HTHP FL |
|---|---|---|---|---|
| Example 2.4c) | 132-92-75-55-38-37 | 40 | 52 | 30 |
| Example 2.4d) | 149-108-88-70-58-40 | 41 | 67 | 25 |
| Example 2.4e) | >300-236-197-133-80-78 | — | — | 26 |

It was found that with a short side chain length a diluent effect is observed whereas, however, the fluid loss effect remains unchanged as compared with the comparative example. With increasing chain length, there is a rise in the absolute rheology of the drilling fluids and also in the PV/YP ratio, which has very positive effects on the discharge power of the drilling fluid.

4. Application Examples for Cement Slurries

Selected synthesis examples were tested in accordance with API standard 10 A for their water retention capacity in cement slurries.

Formula:
cement Lafarge (Class H) 700 g→w/c=0.44
tap water 308 g
defoamer 0.5 g
polymer 4.4 g The distilled water was charged to the Waring blender, then the cement was added with the polymer powder over the course of 15 seconds at low speed (4000 rpm) followed by homogenization at high speed (12 000 rpm) for 35 seconds. These cement slurries were aged in an atmospheric consistometer (Chandler Engineering Co., Serial No. 212) at 80° F. for a period of 20 minutes, the Fann Rheology of the cement slurries was determined at 80° F. (600–300–200–100–6–3 rpm), and then testing was carried out in accordance with API standard for HTHP fluid loss determination at 80° F.

| Polymer from | Cement rheology | PV | YP | HTHP FL |
|---|---|---|---|---|
| Example 1.1 | >300->300-234-187-102-102 | — | — | 250 |
| Example 2.4d) | 180-101-72-39-4-3 | 79 | 22 | 42 |

What is claimed is:

1. A polymeric, acrylamide-free water retention agent based on vinylic sulfonic acids, composed of
   1) ≧30 mol % of component A which is selected from the group consisting of
      a) vinylic substituted sulfonic acid of the series 2-acrylamido-2-methylpropanesulfonic acid (AMPS), vinylsulfonic acid, methallylsulfonic acid, styrenesulfonic acid, salts thereof with a valence of at least 1, or mixtures thereof, or
      b) a divalent salt of homopolymers or copolymers of a vinylic substituted sulfonic acid of the series 2-acrylamido-2-methylpropanesulfonic acid (AMPS), vinylsulfonic acid, methallylsulfonic acid, styrenesulfonic acid or mixtures thereof; and in case 1 a)
   2) component B), composed of
      a) from 4.99 to 60 mol % of an unsaturated polybasic, cis-positioned, carboxylic acid monomer and
      b) from 0.01 to 10 mol % of a monomer having a polyalkylene oxide side chain which contains from 1 to 120 repeating units of the alkylene oxide.

2. The agent as claimed in claim 1, wherein the salt of monomer 1 a) comprises as its cation one from the series $Na^+$, $K^+$, $Ca^{2+}$, $Mg^{2+}$, $Zn^{2+}$, $Ba^{2+}$ and/or $Fe^{2+}$.

3. The agent of claim 1, wherein the salts of the sulfonic acids in the form of their homopolymers and/or copolymers 1 b) comprise $Ca^{2+}$, $Mg^{2+}$ $Zn^{2+}$ $Ba^{2+}$ and/or $Fe^{2+}$ counterions.

4. The agent of claim 1, wherein the homopolymer and/or copolymer 1 b) further comprises up to 70 mol % of a monovalent salt of vinylsulfonic acid, styrenesulfonic acid and methallylsulfonic acid and/or AMPS, in particular a Na, K and/or ammonium salt.

5. The agent of claim 1, wherein the homopolymer and/or copolymer 1 b) comprises up to 50 mol % of at least one unsaturated, polybasic, cis-positioned carboxylic acid compound, such as maleic acid, maleic anhydride, citraconic acid or itaconic acid, for example, as comonomer.

6. The agent of claim 1, wherein the monomer 2 a) comprises maleic acid, maleic anhydride, citraconic acid, itaconic acid or mixtures thereof.

7. The agent of claim 1, wherein the monomer 2 a) is present at least in part in the form of a salt of an at least monovalent cation of the series $Na^+$, $K^+$, $Ca^{2+}$, $Mg^{2+}$, $Zn^{2+}$, $Ba^{2+}$ and/or $Fe^+$.

8. The agent of claim 1, wherein in the monomer 2 b) the polyalkylene glycol side chain is in the form of a (meth) acrylate, (meth)acrylamide, vinyl ester, semiester or amide of maleic acid.

9. The agent of claim 1, wherein the polyalkylene oxide side chain of the monomer 2 b) comprises as alkylene oxide a polyethylene oxide, polypropylene oxide, polytetrahydrofuran or mixtures thereof.

10. The agent of claim 1, wherein the polyalkylene oxide side chain is hydroxy-terminated or methoxy-terminated.

11. The agent of claim 1 which possesses a molar weight between 10 000 and 3 000 000 g/mol and with particular preference between 75 000 and 1 000 000 g/mol.

12. The agent of claim 1 which is preparable by solution, precipitation, gel, emulsion or suspension polymerization.

13. A composition comprising the agent of claim 1 and a formate.

14. The composition of claim 13, wherein the format is an alkali metal formate.

15. A media comprising an electrolyte content of between 50 ppm and their saturation point and the agent of claim 1.

* * * * *